United States Patent
Kato et al.

(10) Patent No.: US 7,542,080 B2
(45) Date of Patent: Jun. 2, 2009

(54) MEASURING DEVICE USING IMAGE AND MEASUREMENT METHOD USING IMAGE

(75) Inventors: Masahiro Kato, Tokyo (JP); Takeshi Kato, Akisima (JP)

(73) Assignee: Hitachi, Ltd., Tokyo (JP)

( * ) Notice: Subject to any disclaimer, the term of this patent is extended or adjusted under 35 U.S.C. 154(b) by 584 days.

(21) Appl. No.: 11/288,301

(22) Filed: Nov. 29, 2005

(65) Prior Publication Data

US 2006/0160616 A1 Jul. 20, 2006

(30) Foreign Application Priority Data

Dec. 27, 2004 (JP) ............................. 2004-377201

(51) Int. Cl.
H04N 9/68 (2006.01)

(52) U.S. Cl. ................... 348/234; 382/173; 348/208.14

(58) Field of Classification Search ............ 348/208.14, 348/169, 234, 238, 348, 208.1; 382/115, 382/173

See application file for complete search history.

(56) References Cited

U.S. PATENT DOCUMENTS 5,355,163 A * 10/1994 Tomitaka .................... 348/234
5,430,809 A * 7/1995 Tomitaka .................... 382/173
7,167,202 B2 * 1/2007 Ojima ........................ 348/348
2005/0014542 A1 1/2005 Ueshima

FOREIGN PATENT DOCUMENTS

| JP | 6-285249 | 3/1993 |
| JP | 11-53563 | 7/1997 |

* cited by examiner

Primary Examiner—David L Ometz
Assistant Examiner—Ahmed A Berhan
(74) Attorney, Agent, or Firm—Reed Smith LLP; Juan Carlos A. Marquez, Esq.

(57) ABSTRACT

The present invention is intended to measure a three-dimensional position of a tracking object snapped by a camera. The invention is based upon a measuring device using an image provided with an image data input part for inputting an image of a tracking object snapped by a camera and a tracking part for calculating a position of the tracking object and the tracking part moves a frame for extracting image data based upon the image, extracts image data included in the frame from the image in each moved position, counts the number of pixels having a hue feature based upon the extracted image data, determines the position of the frame in which the counted number of pixels is maximum for every hue feature and calculates the position of the tracking object based upon the determined position of the frame.

1 Claim, 17 Drawing Sheets

PROCESSING OF HUE FEATURE TRACKING PROGRAM

PROCESSING OF POSITION/ DISTANCE CALCULATION PROGRAM

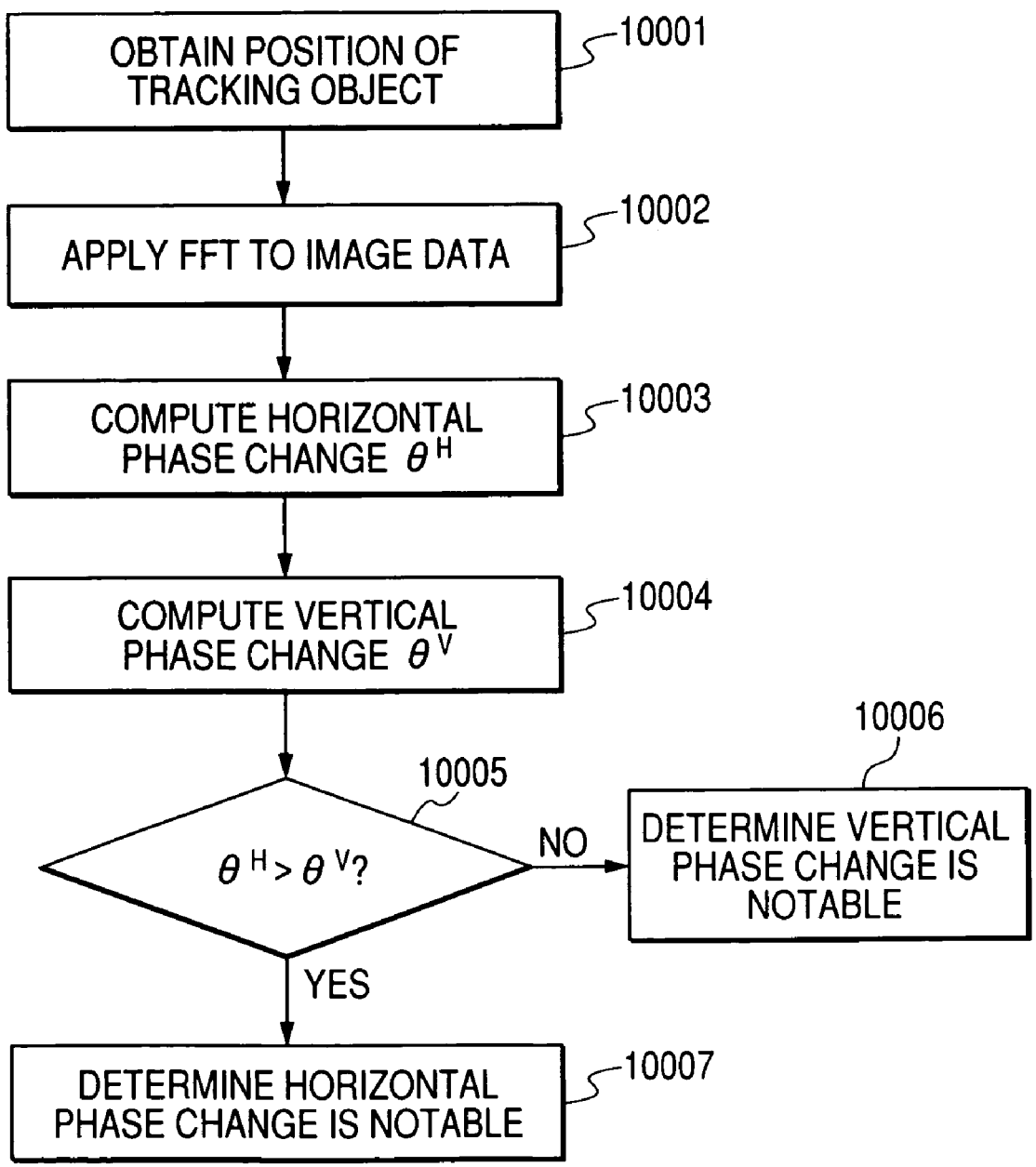

MEASURING DEVICE USING IMAGE AND MEASUREMENT METHOD USING IMAGE

CLAIM OF PRIORITY

The present application claims priority from Japanese application JP 2004-377201 filed on Dec. 27, 2004, the content of which is hereby incorporated by reference into this application.

FIELD OF THE INVENTION

The present invention relates to a measuring device for processing an image taken by a camera and relates to a technique for calculating the position of a tracked object captured within the image.

BACKGROUND OF THE INVENTION

Recently, as a result of the popularization of low-priced CCD camera and CMOS camera and the enhancement of the performance of a personal computer, the execution of real-time image processing has been facilitated. As a result, fields, to which real-time image processing has applied, are fast widened. For example, a processing object of the real-time image processing has widened from an artificial thing having a simple shape to a human figure having a complex shape. In the future, real-time image processing is expected to be applied to wide fields such as game play, surveillance of a figure, authentication of a person, equipment operation interface, acceptance, service and robotics.

A fight game by two characters produced by CG applying real-time image processing technique is popular. In a conventional type of game, operations such as a punch are input by inputting a command to a dedicated operator console. Lately, a fight game in which a player acts such as by actually punching and imaginarily fights in a computer attracts attention. For example, a fight game in which actions are input such as when a player wears an acceleration sensor and acts is known (for example, refer to JP-A No. 285249/1994 and JP-A No. 49436/2004).

However, in the fight game according to the prior art, a player is required to wear a special sensor on a hand and other portions of the player. Besides, the fight game has a problem that only the acceleration of the hands and feet on which the sensor is mounted can be measured. Further, the fight game also has a problem that a cumulative error is caused when a position is computed based upon acceleration information measured by the acceleration sensor.

A game in which the operation of a player imaged by a camera is input to a computer and the player imaginarily fights in the computer is known (for example, refer to JP-A No. 53563/1999). In such a game, as the operation of the player is measured using not a sensor but a camera, information including the acceleration of the hands and feet can be simultaneously acquired real-time.

However, the conventional games have a problem that distance between a camera and a player cannot be measured. Further, these games have a problem that only a position on a two-dimensional plane perpendicular to the optical axis of a camera can be measured. In a fight game, for example, the information of a three-dimensional position of a player is important. Thus a need exists for the ability to measure a three-dimensional position of a tracking object imaged by a camera.

SUMMARY OF THE INVENTION

The present invention is based upon a measuring device using an image provided with an image input device for inputting an image of a tracking object imaged by a camera and a tracking part for acquiring a position of the tracking object and is characterized in that the tracking part moves a domain surrounded by a square frame in the image for extracting image data of predetermined size from the image in the whole image, extracts image data included in the domain surrounded by the square frame from the image in a moved position, counts the number of pixels having a feature of the hue of the tracking object based upon the extracted image data, determines a position of the domain surrounded by the square frame in which the counted number of pixels is maximum every hue feature and calculates the position of the tracking object based upon the determined position of the domain surrounded by the square frame.

According to the invention, the three-dimensional position of the tracking object snapped by the camera can be measured.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts:

FIG. 14 is a flowchart showing the processing of a phase change detection program executed in the measuring device according to an aspect of the present invention;

DETAILED DESCRIPTION

It is to be understood that the figures and descriptions of the present invention have been simplified to illustrate elements that are relevant for a clear understanding of the present invention, while eliminating, for the purpose of clarity, many other elements found in measuring devices and methods of measuring. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1A:
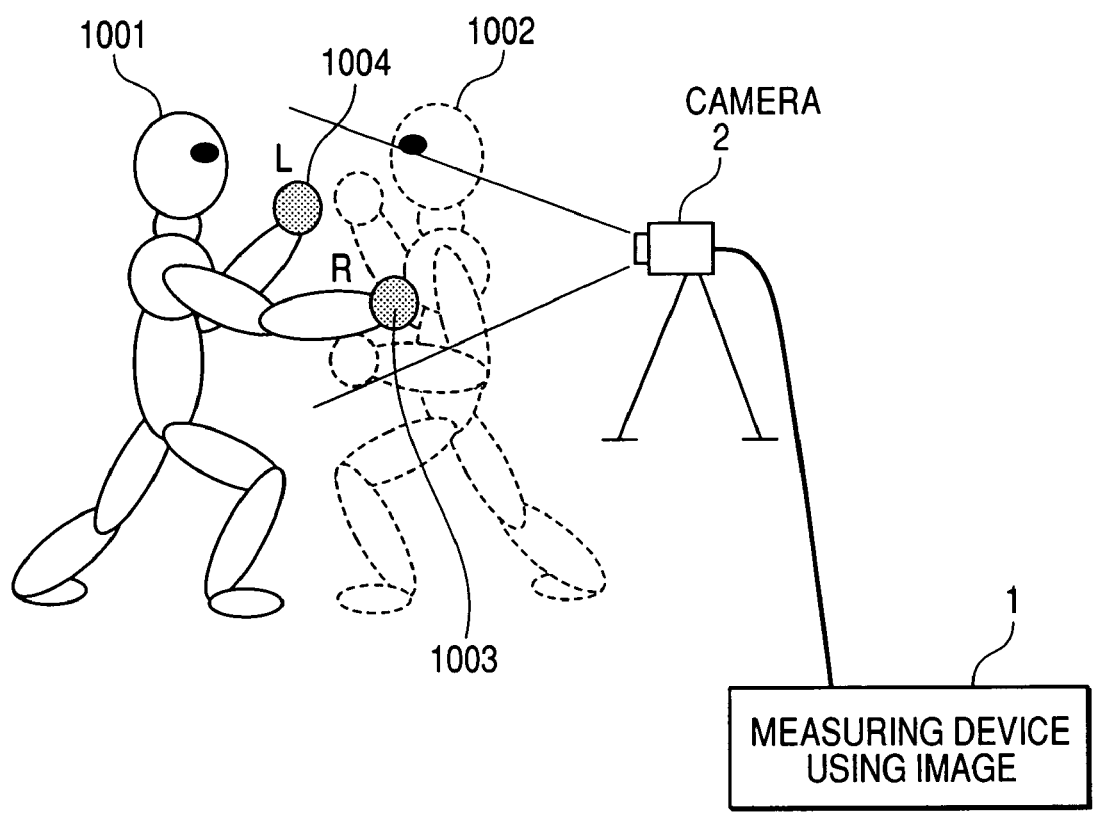
FIG. 1A is an explanatory drawing for explaining a boxing game to which a measuring device using an image according to an aspect of the present invention.

According to an aspect of the present invention, and referring now to FIG. 1A there is an explanatory drawing for illustrating a boxing game to which a measuring device according to an aspect of the present inventions applied. As may be seen in FIG. 1A, a player 1001 boxes with a virtual fight partner 1002 opposite to a camera 2. The player 1001 wears a right glove 1003 on his/her right hand R and wears a left glove 1004 on his/her left hand L. The camera 2 snaps the gloves 1003, 1004 which the player 1001 wears and sends the snapped image to the measuring device using an image 1.

Figure 2:
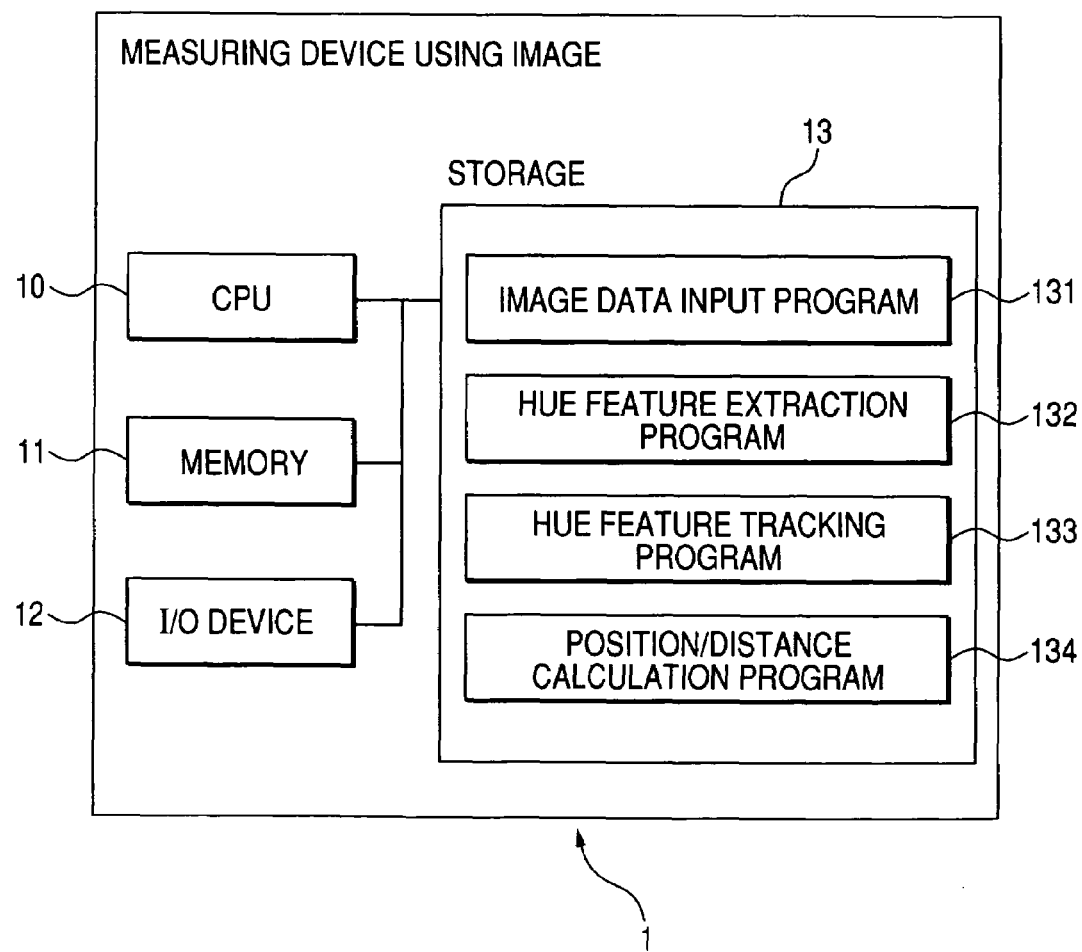
FIG. 2 is a block diagram showing the configuration of the measuring device according to an aspect of the present invention.

The measuring device using an image 1 is provided with the configuration shown in FIG. 2 and is connected to the camera 2. The measuring device using an image 1 calculates distance between the glove 1003 and the camera 2, distance between the glove 1004 and the camera 2 and positions of the gloves 1003, 1004 based upon the image snapped by the camera 2.

This boxing game may be also provided with a display in a position of the virtual fight partner 1002. Hereby, the measuring device using an image 1 can display the operation of the virtual fight partner 1002 on the display.

The measuring device using an image 1 determines whether a punch of the player 1001 hits at the fight partner 1002 or not based upon the calculated distance between the glove 1003 and the camera 2, the calculated distance between the glove 1004 and the camera 2 and the calculated positions of the gloves 1003, 1004. Further, in case the punch hits, the measuring device using an image 1 determines at which part of the fight partner 1002 the punch hits. The measuring device using an image 1 makes the determined result reflected in the operation of the fight partner 1002 and displays it on the display.

Besides, the measuring device using an image 1 displays a punch of the fight partner 1002 on the display. The measuring device using an image 1 determines whether the player 1001 dodges a punch sent by the fight partner 1002 or not based upon the calculated distance between the glove 1003 and the camera 2, the calculated distance between the glove 1004 and the camera 2 and the calculated positions of the gloves 1003, 1004. The measuring device using an image 1 makes the determined result reflected in the operation of the fight partner 1002 and displays it on the display.

As described above, as the operation of the player 1001 is determined based upon the positions of the gloves 1003, 1004 and can be made reflected in the operation of the fight partner 1002 in the boxing game in this embodiment, a sense of realism can be enhanced.

Figure 1B:
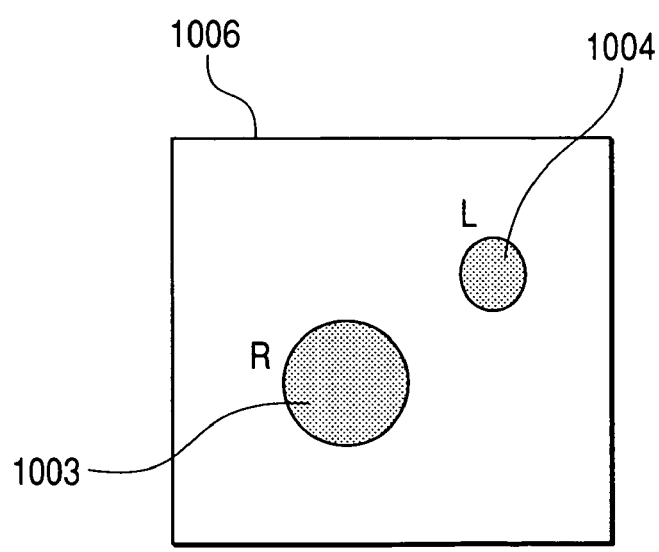
FIG. 1B is an explanatory drawing for explaining an image snapped by a camera according to an aspect of the present invention.

Referring now to FIG. 1B there is an explanatory drawing for explaining an image 1006 snapped by the camera 2 according to an aspect of the present invention. As may be seen in FIG. 1B, the image 1006 snapped by the camera 2 includes the right glove 1003 and the left glove 1004.

The measuring device using an image 1 receives the image 1006 from the camera 2. The measuring device using an image 1, measures the area of each of the gloves 1003, 1004 in the image 1006. The measuring device using an image 1 calculates distance between the camera 2 and the glove 1003 and distance between the camera 2 and the glove 1004 based upon each measured area. Besides, the measuring device using an image 1 measures positions of the gloves 1003, 1004 in the image 1006. The measuring device using an image 1 calculates positions of the gloves 1003, 1004 in real space based upon the positions in the image.

Referring now to FIG. 2, which is a block diagram showing the configuration of the measuring device using an image 1 according to an aspect of the present invention.

The measuring device using an image 1 is provided with a CPU 10, a memory 11, an I/O device 12 and storage 13.

The CPU 10 executes various processing by calling and executing various programs from the memory 11. The memory 11 temporarily stores each program stored in the storage 13 according to processing by the CPU 10. The I/O device 12 is connected to the camera 2, a console and others and inputs/outputs various information.

The storage 13 stores an image data input program 131, a hue feature extraction program 132, a hue feature tracking program 133 and a position/distance calculation program 134.

The image data input program 131 inputs an image snapped by the camera 2. The hue feature extraction program 132 extracts the features of hue from the image input by the image data input program 131 and temporarily stores them in the memory 11. The hue feature tracking program 133 tracks a tracking object having the features of the hue stored in the memory 11. The position/distance calculation program 134 calculates distance between the tracking object and the camera 2 and a position of the tracking object.

Figure 3:
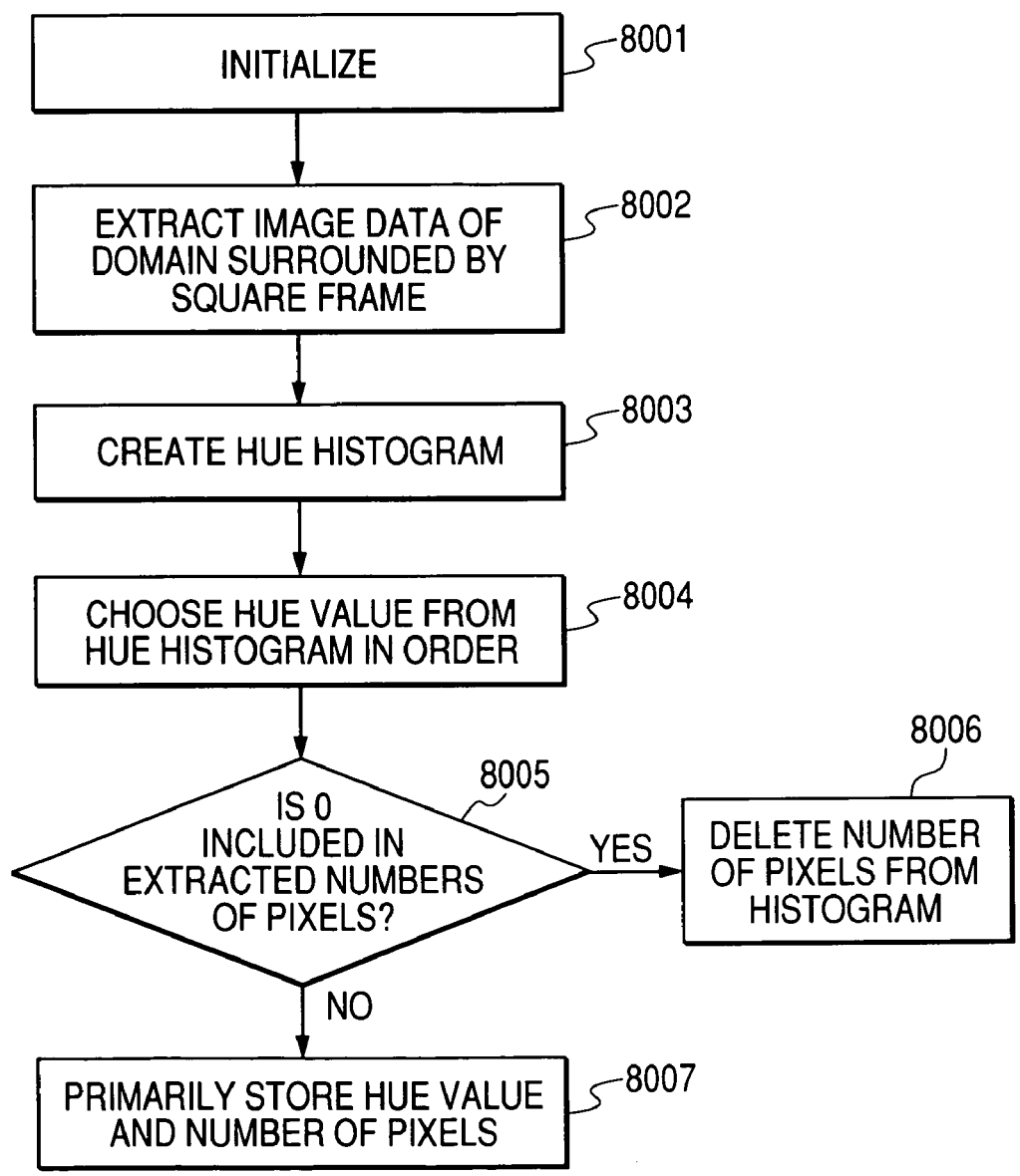
FIG. 3 is a flowchart showing a primary extraction process by a hue feature extraction program executed in the measuring device according to an aspect of the present invention.

In FIG. 3 there is a flowchart showing a primary extraction process by the hue feature extraction program 132 executed in the measuring device using an image 1 according to an aspect of the present invention.

First, initialization is executed (8001). An image domain surrounded by a square frame means a domain from which various programs stored in the measuring device using an image 1 extract an image and it is desirable that one side is equivalent to approximately a few tens dots. The square frame surrounding a domain set in an initial position is set so that it includes at least a portion of the tracking object (for example, the gloves in the boxing game).

The initial position may be also input via the I/O device 12 by a user and may be also preset. In case the initial position is preset, the user is required to move the tracking object so that the whole tracking object is included in the square frame set in the initial position. For example, in the boxing game, the player 1001 moves the gloves 1003, 1004 so that the whole both gloves 1003, 1004 are included in the square frame.

Next, image data included in the square frame is extracted from the image input by the image data input program 131 (8002).

Next, a hue histogram is created based upon the extracted image data (8003). The hue histogram shows the number of pixels affiliated with each hue value divided in 360 from 0 degree to 359 degrees for example.

Next, a hue value is chosen from the hue histogram in order from a lower degree (8004).

The number of pixels affiliated with the chosen hue value is extracted from the hue histogram. Further, the number of pixels affiliated with a hue value in the vicinity of the chosen hue value is extracted from the hue histogram. The hue value in the vicinity means plural hue values continuous with the chosen hue value in the center and for example, means hue values the degrees of which are higher and lower than the degree of the chosen hue value by a few degrees.

Next, it is determined whether '0' is included in the extracted all numbers of pixels (the number of pixels affiliated with the chosen hue value and the numbers of pixels affiliated with the hue values in the vicinity) or not (8005).

As it is determined that the chosen hue value has no relevance to the features of the hue of the tracking object when at least one '0' is included in the numbers of pixels, the number of pixels affiliated with the chosen hue value is deleted from the hue histogram (8006). The reason is that the tracking object included in size to some extent in the extracted image data has continuous plural hue values. In the meantime, in case hue having the number of pixels of zero exists in the vicinity of the extracted hue value, the corresponding hue value may be noise.

In the meantime, as it is determined that the chosen hue value may have relevance to the features of the hue of the tracking object when no '0' is included in the extracted numbers of pixels, the chosen hue value and the number of pixels affiliated with the hue value are primarily stored in the memory (8007).

The steps 8005 to 8007 are repeated by all hue values.

Conspicuous hue values can be extracted from image data extracted from an image domain surrounded by the square frame and including the whole tracking object by the above-mentioned primary extraction process.

Figure 4:
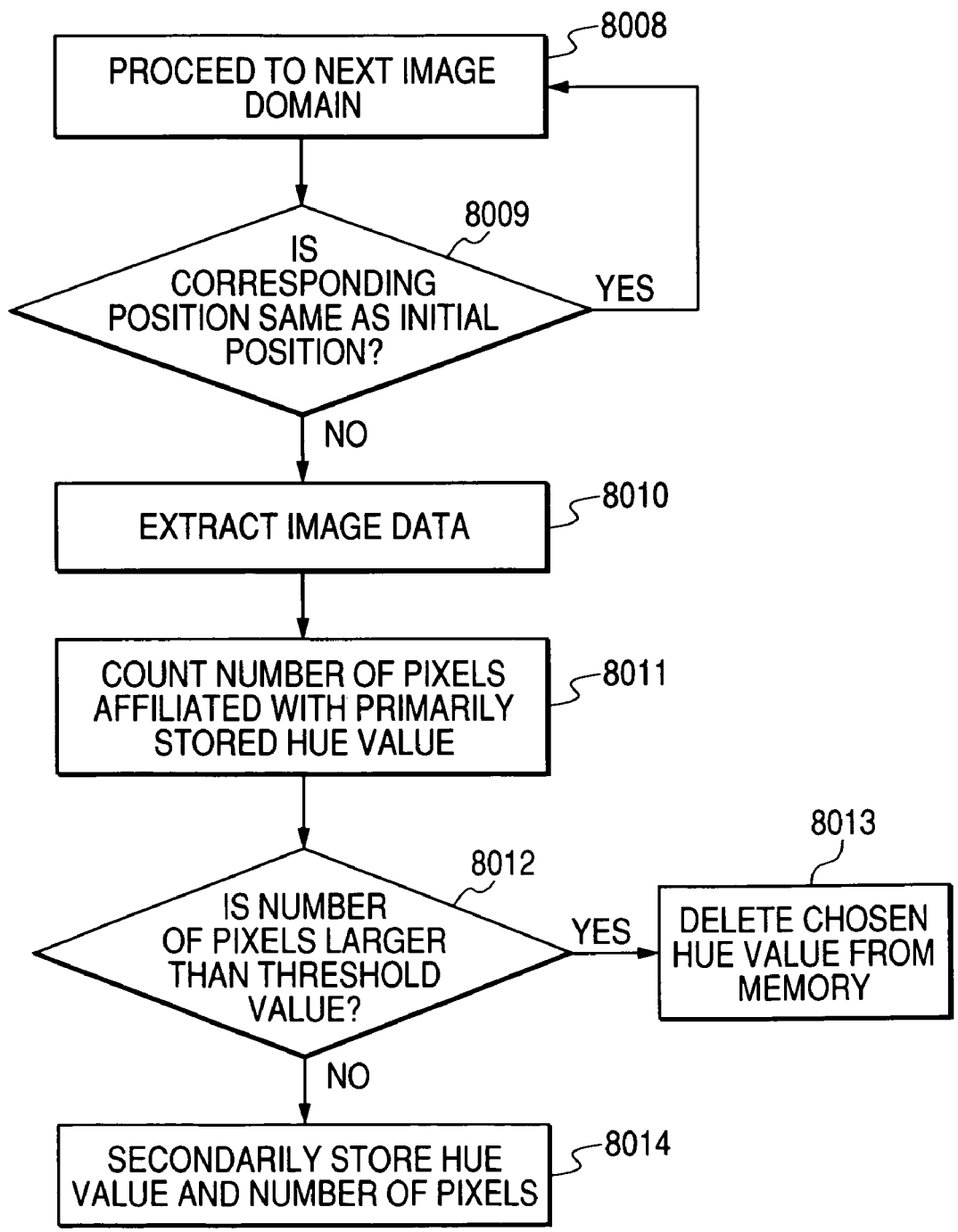
FIG. 4 is a flowchart showing a secondary extraction process by the hue feature extraction program executed in the measuring device according to an aspect of the present invention.

Shown in FIG. 4 there is a flowchart showing a secondary extraction process by the hue feature extraction program 132 executed in the measuring device using an image 1 according to an aspect of the present invention.

First, the square frame is moved so that the square frame sequentially chooses the whole image input by the image data input program 131 (8008). The following steps 8009 to 8014 are repeated in all positions.

Next, it is determined whether a position of the moved square frame is the same as the initial position in the step 8001 of the primary extraction process shown in FIG. 3 or not (8009). As the same hue values as the hue values stored in the primary extraction process are extracted when the above-mentioned position is the same as the initial position and the case is inappropriate to delete the features of the hue of a background, control is returned to the step 8008 and the square frame is moved to the next position.

In the meantime, as a hue value of the background different from the hue values stored in the primary extraction process is extracted when the above-mentioned position is different from the initial position, image data in an image domain surrounded by the square frame is extracted (8010). Next, one is chosen out of the hue values primarily stored in the step 8007 of the primary extraction process.

The number of pixels affiliated with the chosen hue value is counted based upon the extracted image data (8011).

Next, it is determined whether the counted number of pixels is larger than a threshold value or not (8012).

When the counted number of pixels is larger than the threshold value, it is determined that the chosen hue value is often included in the background and the chosen hue value is deleted from the memory 11 primarily storing the chosen hue value (8013). The reason is that the hue value often included in the background neither contributes as the features of the hue of the tracking object nor contributes to the separation of the background and the tracking object.

In case the primarily stored hue values are all deleted, it is determined that the features of the hue of the tracking object cannot be detected. In this case, it is informed via the I/O device 12 that tracking is impossible. For example, the measuring device using an image 1 cannot track a ball of the same color when the player stands with the red sky in sunset for the background.

In the meantime, when the counted number of pixels is equal to or smaller than the threshold value, it is determined that the chosen hue value is seldom included in the background, the corresponding chosen hue value and the number of pixels affiliated with the hue value are secondarily stored in the memory 11 (8014), and the secondarily stored hue value is set as the feature of the hue of the tracking object.

The steps 8011 to 8014 are repeated until all hue values are chosen.

The features of the hue of the tracking object can be extracted by deleting hue values included in the background in large quantities from the primarily stored hue values by the above-mentioned secondary extraction process. Therefore, as the tracking object is tracked using the hue features differentiated from the background, the precision of tracking can be enhanced.

Figure 5:
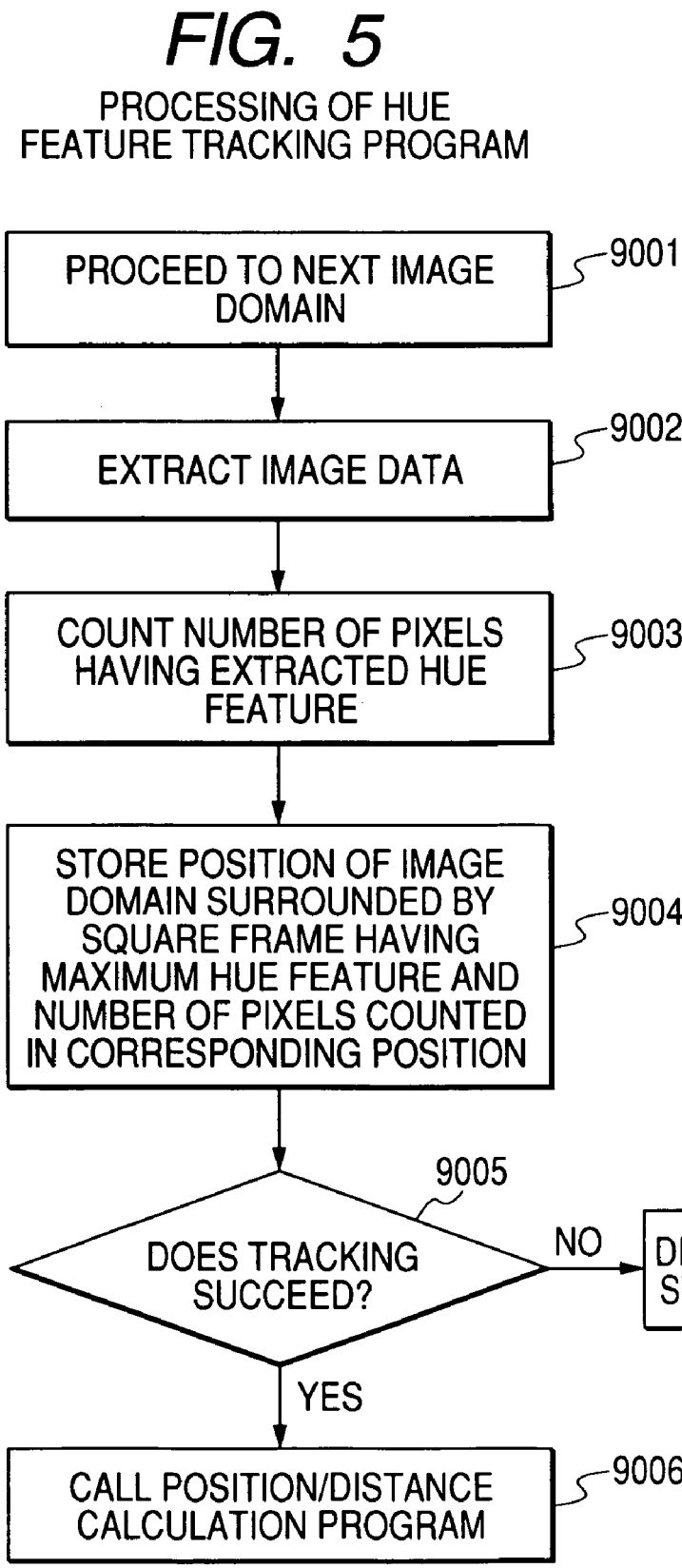
FIG. 5 is a flowchart showing the processing of a hue feature-tracking program executed in the measuring device according to an aspect of the present invention.

In FIG. 5 there is a flowchart showing processing by the hue feature-tracking program 133 executed in the measuring device using an image 1 according to an aspect of the present invention.

First, the square frame surrounding an image domain is moved so that the square frame sequentially chooses the whole image input by the image data input program 131 (9001). Next, image data included in the image domain surrounded by the square frame is extracted based upon the image input by the image data input program 131 (9002). Next, the number of pixels having a hue feature extracted by the hue feature extraction program 132 is counted based upon the extracted image data (9003). In case plural hue features are extracted, the number of pixels is counted every hue feature.

The steps 9002 and 9003 are repeated in all positions in which the square frame is moved.

Next, the image domain surrounded by the square frame in which the maximum number of pixels is counted is determined. The determined position of the image domain (for example, its central coordinates) and the number of pixels counted in the position are stored in the memory 11 (9004). In case plural hue features are extracted, the position of the image domain surrounded by the square frame in which the number of pixels is maximized and the number of pixels counted in the position is stored every hue value.

Next, it is determined whether the tracking of the tracking object succeeds or not based upon the information stored in the memory 11 (9005). Concretely, when the number of pixels stored in the memory 11 is larger than the corresponding threshold value, it is determined that the tracking succeeds and when the number of pixels is smaller than the threshold value, it is determined that the tracking fails. In case plural hue features are extracted, the success of the tracking may be determined by referring to whether the ratio of all numbers of pixels stored in the memory is within a predetermined range. For the predetermined range, it is desirable that a range that can be judged similar to the ratio of the numbers of pixels secondarily stored by the hue feature extraction program 132 is predetermined.

When the tracking fails, the position of the image domain surrounded by the square frame and the number of pixels counted in the position respectively stored in the step 9004 are deleted from the memory 11 (9007). Further, the failure of the tracking is informed via the I/O device 12. In the meantime, when the tracking succeeds, the position/distance calculation program 134 is called (9006).

Figure 6:
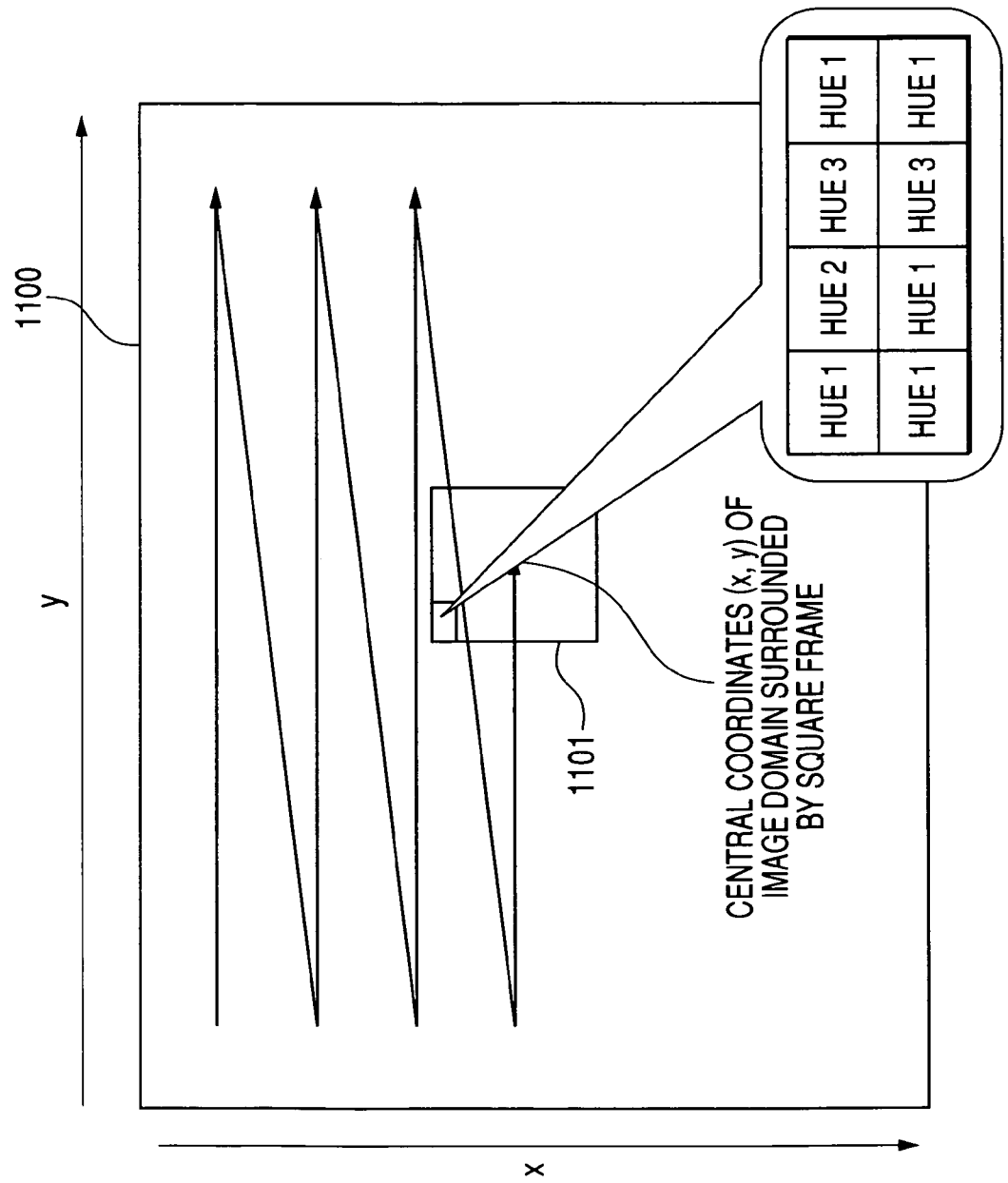
FIG. 6 is an explanatory drawing for explaining the processing of the hue feature-tracking program executed in the measuring device according to an aspect of the present invention.

Referring now to FIG. 6 there is shown explanatory drawing for explaining the processing of the hue feature tracking program 133 executed in the measuring device using an image 1 according to an aspect of the present invention.

The hue feature tracking program 133 moves the square frame 1101 in the whole image 1100. Next, the program counts the number of pixels having a certain hue feature in each moved position. Pixels included in the square frame 1101 respectively have a hue value. For example, in a small region at the left upper end of the square frame 1101, pixels having hue values shown in a balloon in FIG. 6 are included.

Next, a position of the square frame in which the counted number of pixels is maximized is determined. Next, the determined position of the square frame and the number of pixels counted in the position are stored in the memory 11. It is determined whether the tracking of the tracking object succeeds or not based upon the information stored in the memory 11.

Figure 7:
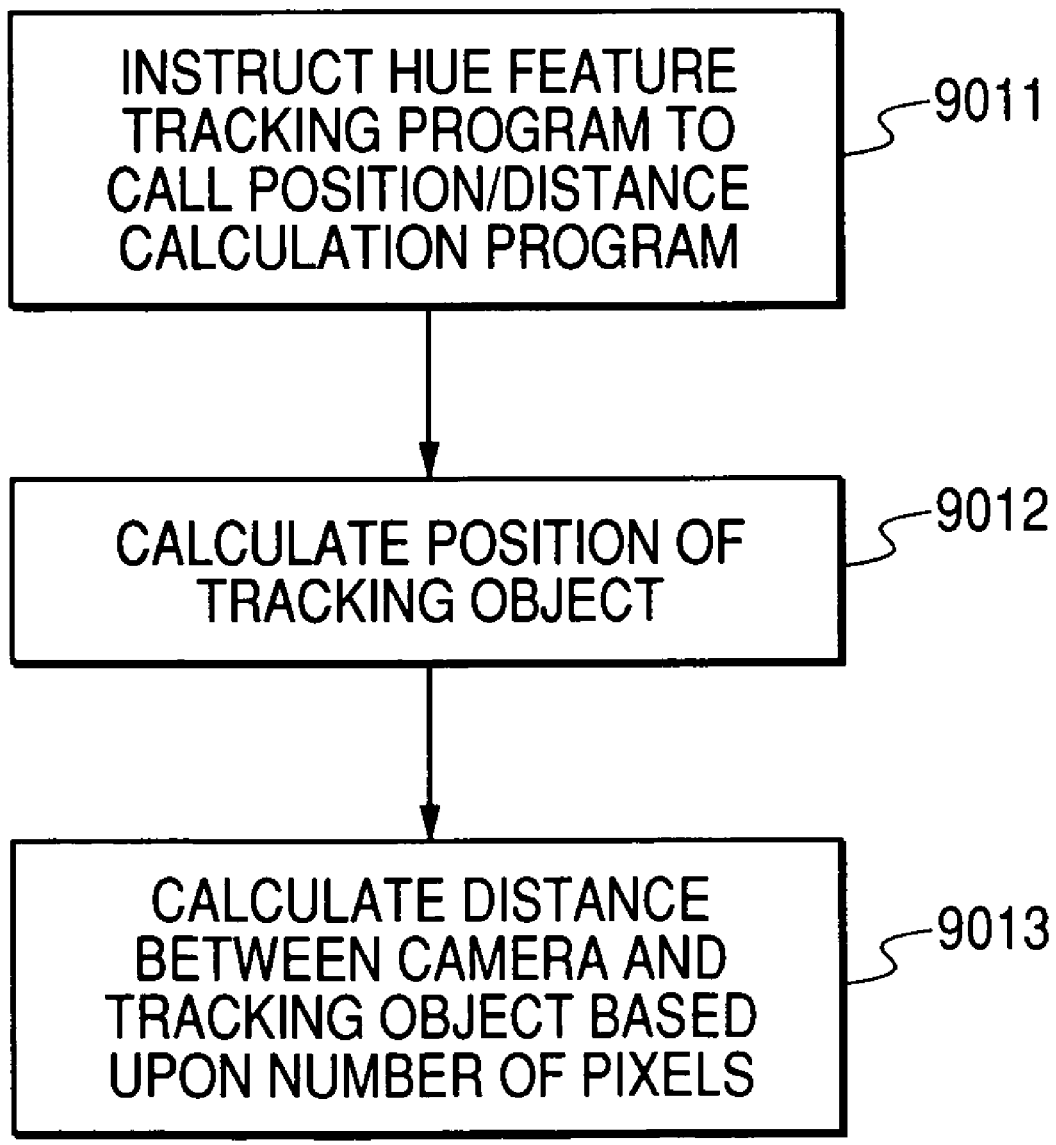
FIG. 7 is a flowchart showing the processing of a position/distance calculation program executed in the measuring device according to an aspect of the present invention.

As may be seen in FIG. 7 there is a flowchart showing the processing of the position/distance calculation program 134 executed in the measuring device using an image 1 according to an aspect of the present invention.

The position/distance calculation program 134 initiates processing by being called from the hue feature-tracking program 133 (9011).

First, a position of the tracking object is calculated (9012). In case only one hue feature is extracted, a position of the square frame stored in the memory 11 is set as a position of the tracking object. In case plural hue features are extracted, an average value of all positions of the square frame stored in the memory 11 is set as the position of the tracking object.

Next, a distance between the camera 2 and the tracking object is calculated based upon the number of pixels stored in the memory 11 (9013). Concretely, the hue feature-tracking program calculates a square root of a value acquired by dividing the number of pixels secondarily stored by the hue feature extraction program 132 by the number of pixels stored in the step 9004. When the acquired value is multiplied by the known initial distance between the camera 2 and the tracking object initially in the processing of the hue feature extraction program 132, the current distance between the camera 2 and the tracking object may be acquired.

As described above, the position of the tracking object and the distance between the camera 2 and the tracking object can be calculated. The boxing game described in relation to FIG. 1 can be realized using the position of the tracking object and the distance between the camera 2 and the tracking object respectively calculated.

The conventional type boxing game has the problem that the acceleration sensor is required to be mounted on a hand of a player and only the acceleration of the hand on which the sensor is mounted can be measured. The conventional type boxing game has the problem that a cumulative error may be caused when speed and distance are calculated based upon acceleration information acquired by the acceleration sensor. However, in a boxing game to which the measuring device using an image 1 in this embodiment is applied, the acceleration sensor is not required to be mounted on a hand as would be conventionally done and these problems can be solved.

A boxing game that measures a two-dimensional position of a human body using a camera and a measuring device using an image has been also proposed. However, the boxing game has a problem that it lacks punch as a game because the boxing game cannot measure a three-dimensional position of a human body and cannot reflect it in a motion of a virtual fight partner. As a player is tracked without separating the player from a background image in the boxing game, the boxing game also has a problem that a position of the player, the background image, and the color of his/her clothes and others are required to be specified.

However, as the measuring device using an image 1 in this embodiment tracks the tracking object with the tracking object separated from the background and further measures the three-dimensional position and distance of the tracking object, the above-mentioned problems can be solved. Therefore, the boxing game, to which the measuring device using an image 1 in this embodiment is applied, can enhance a sense of realism.

Figure 8A:
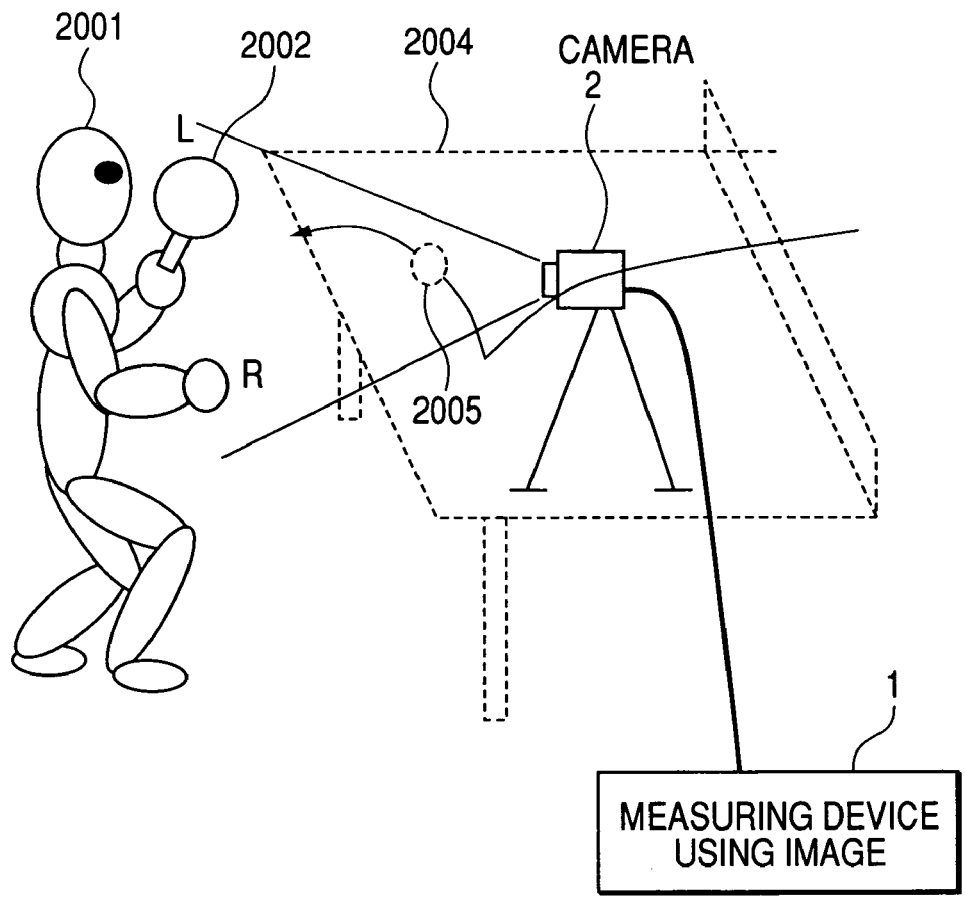
FIG. 8A is an explanatory drawing for explaining a table-tennis game according to an aspect of the present invention.

According to a further aspect of the present invention, and referring to FIG. 8A, where there is shown an explanatory drawing for explaining a table-tennis game to which a measuring device using an image 1 equivalent to another embodiment of the invention is applied.

A player 2001 plays table tennis with a virtual fight partner via a virtual table 2004 with the player opposite to a camera 2. The player 2001 has a racket 2002 in his/her right hand R or left hand L. The camera 2 snaps the racket 2002 grasped by the player 2001 and sends the snapped image to the measuring device using an image 1.

The measuring device using an image 1 has the similar configuration to that of the measuring device using an image 1 shown in FIG. 2 above and is connected to the camera 2. The measuring device using an image 1 calculates a distance between the racket 2002 and the camera 2 and a position of the racket 2002 based upon the image snapped by the camera 2.

The table-tennis game may be also provided with a display in a position of the virtual table 2004. Hereby, the measuring device using an image 1 can display a virtual fight partner, the table 2004 and a ball 2005 on the display.

The measuring device using an image 1 determines whether the ball 2005 hit by the virtual fight partner hits the racket 2002 or not based upon the distance between the racket 2002 and the camera 2 and the position of the racket 2002 respectively calculated. In case the ball hits the racket 2002, the measuring device using an image 1 determines which part of the racket 2002 the ball hits. The measuring device using an image 1 makes the determined result reflected in the locus of the ball 2005 and the operation of the fight partner and displays them on the display.

Figure 8B:
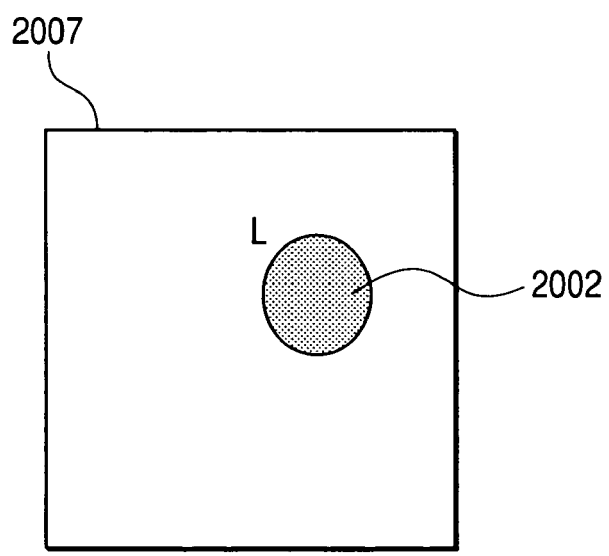
FIG. 8B is an explanatory drawing for explaining an image snapped by a camera according to an aspect of the present invention.

As may be seen in FIG. 8B there is an explanatory drawing for explaining an image 2007 snapped by the camera 2 according to an aspect of the present invention. In FIG. 8B, the racket 2002 is reflected in image 2007 snapped by the camera 2.

The measuring device using an image 1 receives the image 2007 from the camera 2. Then, the measuring device using an image 1 measures the area of the racket 2002 reflected in the image 2007 and calculates a distance between the camera 2 and the racket 2002 based upon the measured area. Besides, the measuring device using an image 1 measures a position of the racket 2002 reflected in the image 2007 and calculates the position of the racket 2002 based upon the measured position in the image.

Figure 9A:
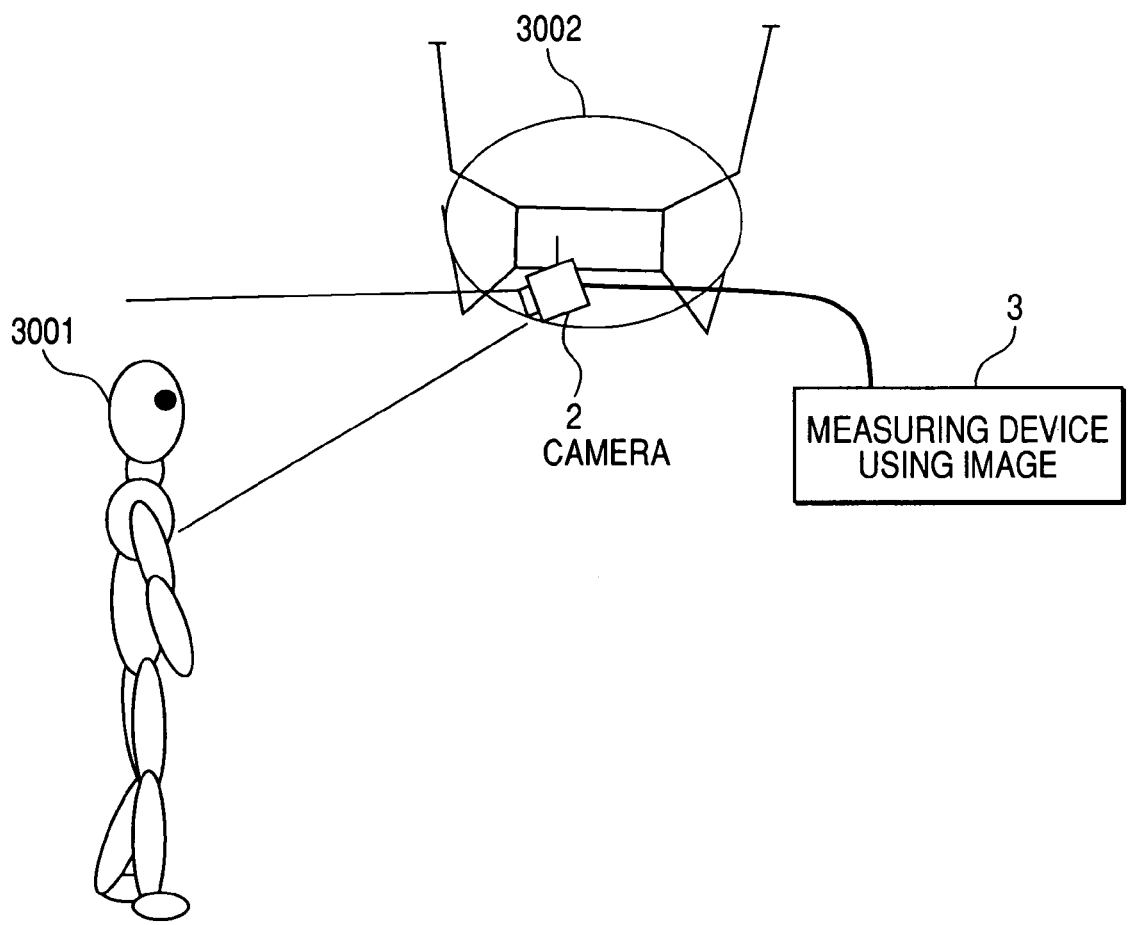
FIG. 9A is an explanatory drawing for explaining a remote control system of a robot according to an aspect of the present invention.

Referring now to FIG. 9A there is an explanatory drawing for explaining a remote control system of a robot which walks on a ceiling to which a measuring device using an image 3 according to an aspect of the present invention.

An operator 3001 instructs a camera 2 attached to the robot which walks on a ceiling 3002. The camera 2 snaps a face of the operator 3001 and sends the snapped image to the measuring device using an image 3.

Figure 10:
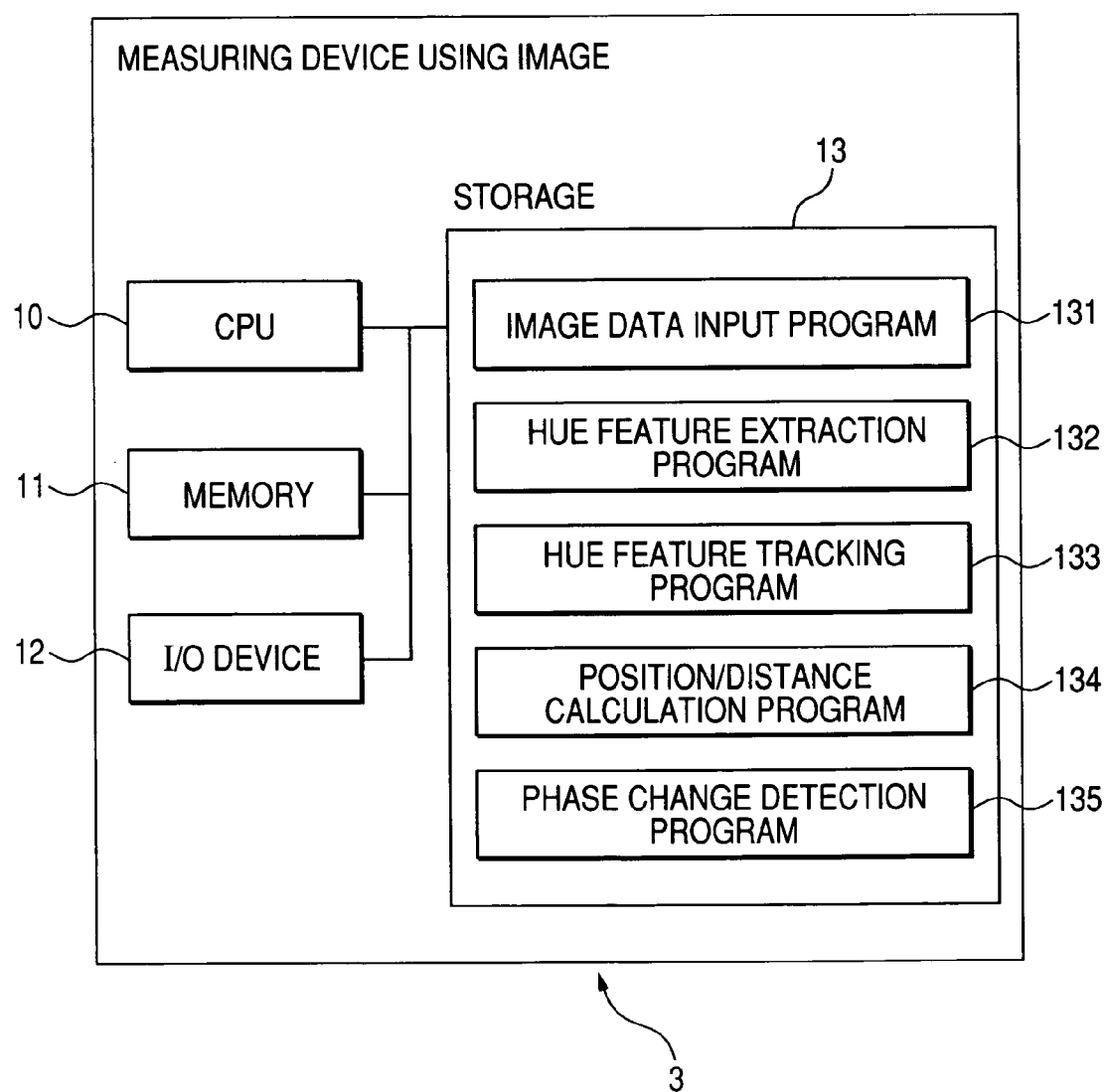
FIG. 10 is a block diagram showing the configuration of the measuring device according to an aspect of the present invention.

The measuring device using an image 3 has configuration shown in FIG. 10 and is connected to the camera 2. The measuring device using an image 3 calculates a distance between the face of the operator 3001 and the camera 2 and a position of the face of the operator 3001 based upon the image snapped by the camera 2. Further, the measuring device using an image 3 calculates motions of the face and the neck of the operator 3001.

The measuring device using an image 3 determines whether the operator 3001 has intention to instruct the robot which walks on a ceiling 3002 or not based upon the calculated a distance between the face of the operator 3001 and the camera 2 and the calculated position of the face of the operator 3001. Besides, the measuring device using an image 3 determines a command to instruct the robot 3002 to operate based upon the motions of the face and the neck of the operator 3001. Therefore, the measuring device using an image 3 is required to be provided with a table (not shown) for relating the motions of the face and the neck of the operator 3001 and the command to instruct the robot which walks on a ceiling 3002 to operate.

Figure 9B:
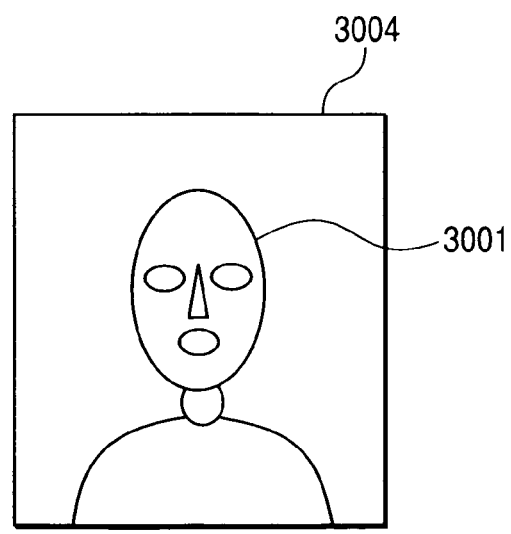
FIG. 9B is an explanatory drawing of an image snapped by a camera according to an aspect of the present invention.

As may be seen in FIG. 9B there is an explanatory drawing for explaining an image 3004 snapped by the camera 2 according to an aspect of the present invention. The face of the operator 3001 is reflected in the image 3004 snapped by the camera 2.

The measuring device using an image 3 receives the image 3004 from the camera 2. Then, the measuring device using an image 3 measures the area of the face of the operator 3001 reflected in the image 3004 and calculates a distance between the camera 2 and the face of the operator 3001 based upon the measured area. Besides, the measuring device using an image 3 measures a position of the face of the operator 3001 reflected in the image and calculates a position of the face of the operator 3001 based upon the measured position in the image. As described in relation to FIG. 14 later, the measuring device using an image 3 calculates the motions of the face and the neck.

As may be seen in FIG. 10 there is a block diagram showing the configuration of the measuring device using an image 3 according to an aspect of the present invention.

The measuring device using an image 3 has the same configuration as that of the measuring device using an image 1 as described above except that a phase change detection program 135 is stored in storage 13. The same number is allocated to the same configuration and the description is omitted.

The phase change detection program 135 computes a phase change of an object which a hue feature tracking program 133 tracks and temporarily stores the computed phase change in the memory 11.

Figure 11A:
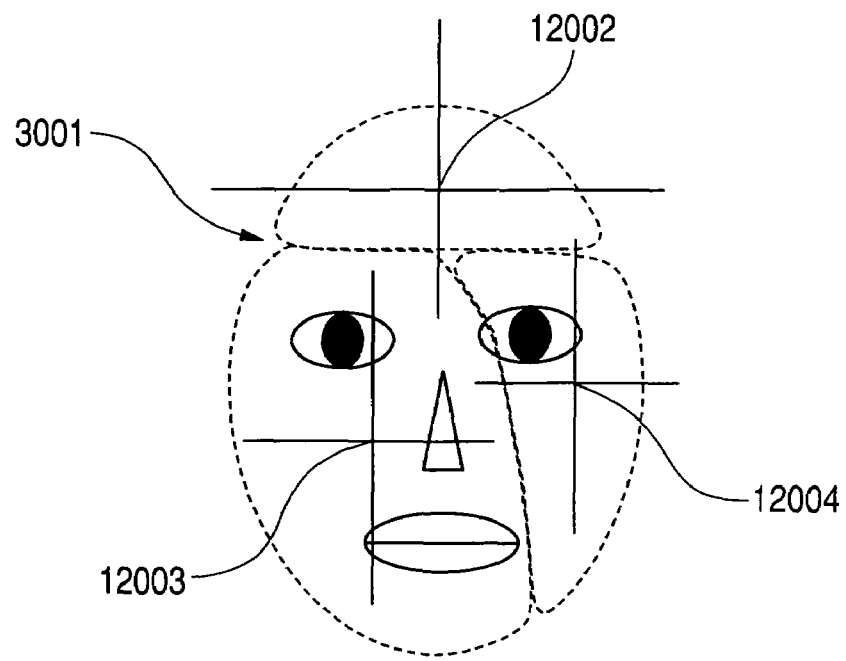
FIG. 11A is an explanatory drawing of a face of an operator that is an object to be tracked by the measuring device according to an aspect of the present invention.
Figure 11B:
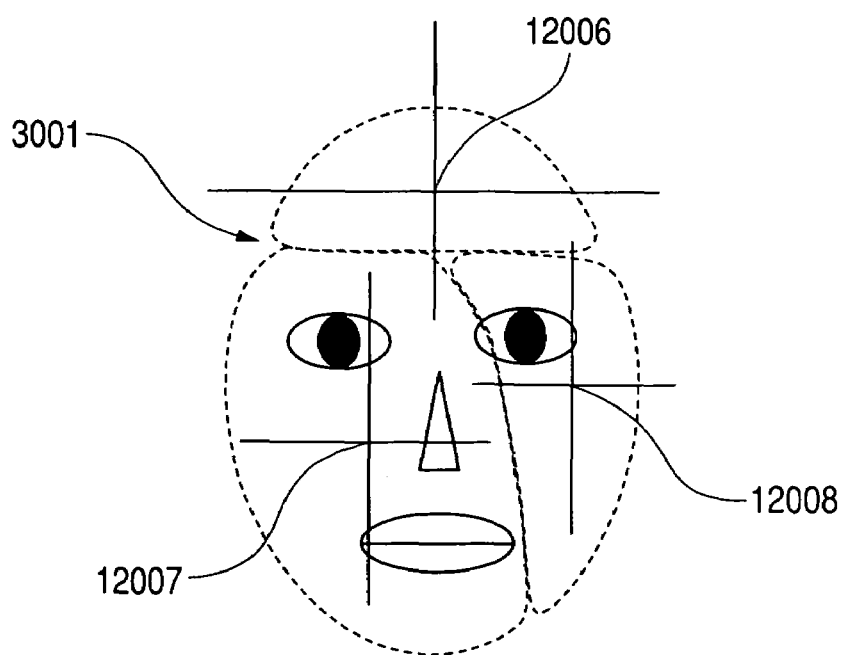
FIG. 11B is an explanatory drawing of the face of an operator that is an object to be tracked by the measuring device according to an aspect of the present invention.

Referring now to FIGS. 11A and 11B which are explanatory drawings for explaining the processing by the measuring device using an image 3 of the face of the operator 3001 which is a tracking object according to an aspect of the present invention.

Suppose that a hue feature extraction program 132 extracts three hue features from the image in which the face of the operator 3001 is reflected. Besides, suppose that the hue feature tracking program 133 determines each central position of a square frame surrounding an image domain in which the number of pixels having each hue feature is maximum as positions 12002, 12003, 12004 in the step 9004 shown in FIG. 5.

At this time, the ratio of the numbers of pixels having each hue feature in each image data extracted from the square frame in the positions 12002, 12003, 12004 and the ratio of the numbers of pixels secondarily stored by the hue feature extraction program 132 are the same. Therefore, the hue feature-tracking program 133 can determine whether tracking succeeds or not using whether the ratio of the numbers of pixels is in a predetermined range or not in the step 9005.

A position/distance calculation program 134 can acquire a position of the face of the operator 3001 that is the tracked object by calculating an average value of these positions 12002, 12003, 12004.

As may be seen in FIG. 11B there is shown a case that the operator 3001 moves away from the camera 2. Suppose that the hue feature tracking program 133 determines each central position of the square frame of each image domain having each hue feature in which the number of pixels is maximum as positions 12006, 12007, 12008 in the step 9004.

Even if the operator 3001 goes away from the camera 2, the ratio of the numbers of pixels having each hue feature in each image data extracted from the square frame in the positions 12006, 12007, 12008 and the ratio of the numbers of pixels secondarily stored by the hue feature extraction program 132 are the same. However, the number of pixels having each hue feature decreases in each image data. Then, the position/distance calculation program 134 calculates a square root of each value acquired by dividing the numbers of pixels secondarily stored by the hue feature extraction program 132 by the numbers of pixels having each hue feature in each image data extracted from the square frame in the positions 12006, 12007, 12008. The position/distance calculation program 134 can acquire the current distance between the camera 2 and the face of the operator 3001 by multiplying each acquired value by a distance between the camera 2 and the operator 3001 in the processing of the hue feature extraction program 132.

Figure 12A:
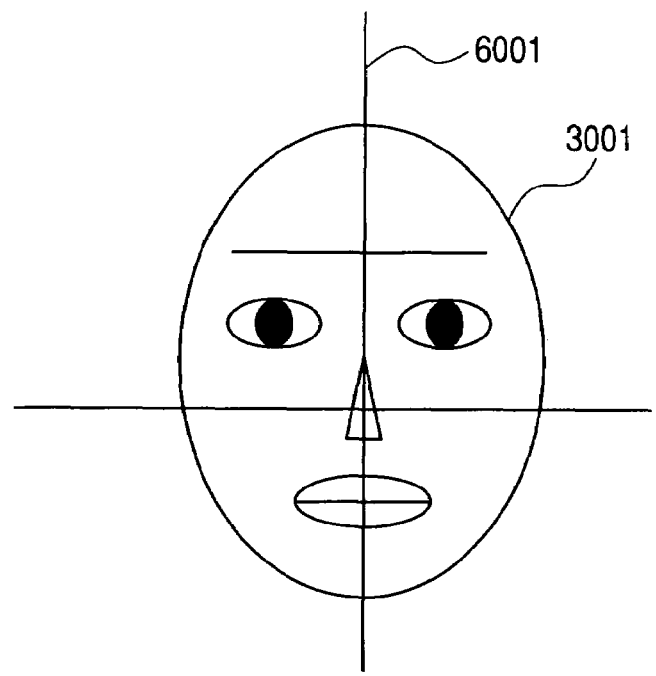
FIG. 12A is an explanatory drawing explaining a motion of the operator's face according to an aspect of the present invention.
Figure 12B:
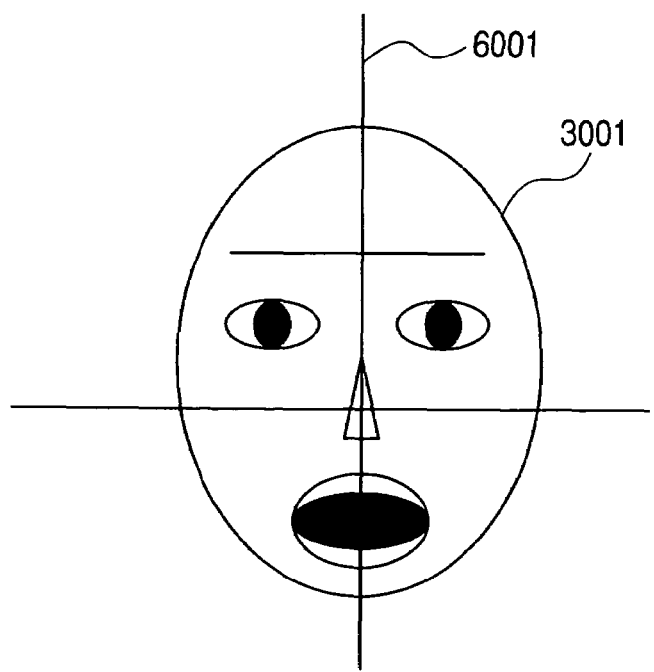
FIG. 12B is an explanatory drawing illustrating a motion of the operator's face according to an aspect of the present invention.
Figure 12C:
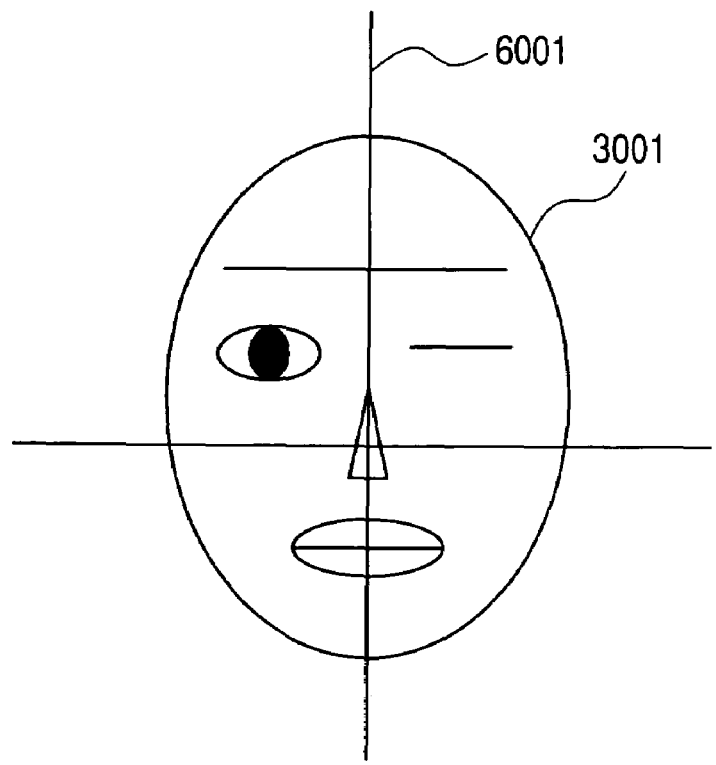
FIG. 12C is an explanatory drawing illustrating a motion of the operator's face according to an aspect of the present invention.

Referring now collectively to FIGS. 12A, 12B and 12C which are explanatory drawings for explaining a motion of the face of the operator 3001 according to an aspect of the present invention.

In these explanatory drawings, a coordinate system 6001 having the center of the face as an origin is overlapped on the face of the operator 3001 snapped by the camera1 2. For the center of the face, a position of the tracking object calculated by the position/distance calculation program 134 is used. In the coordinate system, a right upper part is set as a first quadrant, a left upper part is set as a second quadrant, a left lower part is set as a third quadrant, and a right lower part is set as a fourth quadrant.

The measuring device using an image 3 detects a position in which hue changes and determines it as a motion of the face of the operator 3001.

FIG. 12A shows the face of the operator 3001 at normal time. FIG. 12B shows the face of the operator 3001 who opens his/her mouth. That is, the measuring device using an image 3 determines that the operator 3001 opens his/her mouth when hue in the third and fourth quadrants in the coordinate system 6001 changes.

FIG. 12C shows the face of the operator 3001 who closes his/her left eye. That is, the measuring device using an image 3 determines that the operator 3001 closes his/her left eye when hue in the first quadrant in the coordinate system 6001 changes. Similarly, the measuring device using an image determines that the operator 3001 closes his/her right eye when hue in the second quadrant in the coordinate system 6001 changes.

The measuring device using an image 3 extracts a command to instruct operation from a table relating motions of the face and the neck of the operator 3001 and a command to instruct the robot which walks on a ceiling 3002 to operate when the measuring device using an image 3 determines the motion of the face. The measuring device sends the extracted command to instruct operation to the robot which walks on a ceiling 3002.

Figure 13A:
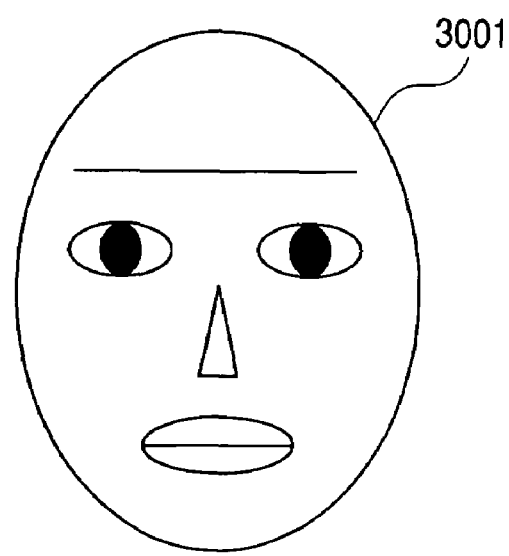
FIG. 13A is an explanatory drawing illustrating a motion of the operator's head according to an aspect of the present invention.
Figure 13B:
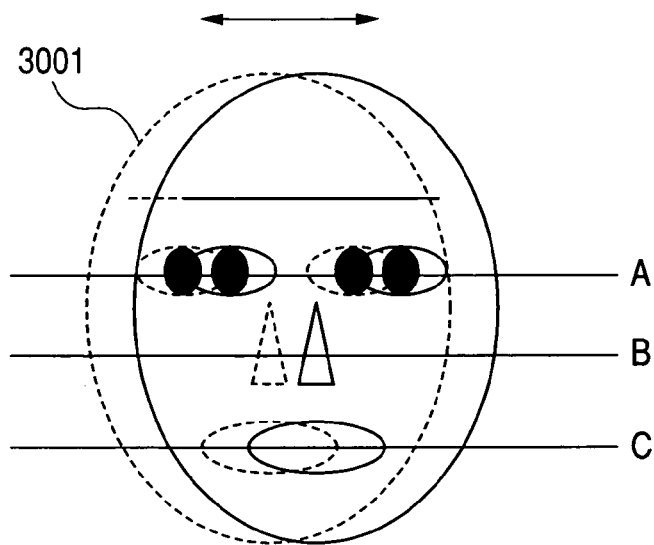
FIG. 13B is an explanatory drawing illustrating the motion of the operator's head according to an aspect of the present invention.
Figure 13C:
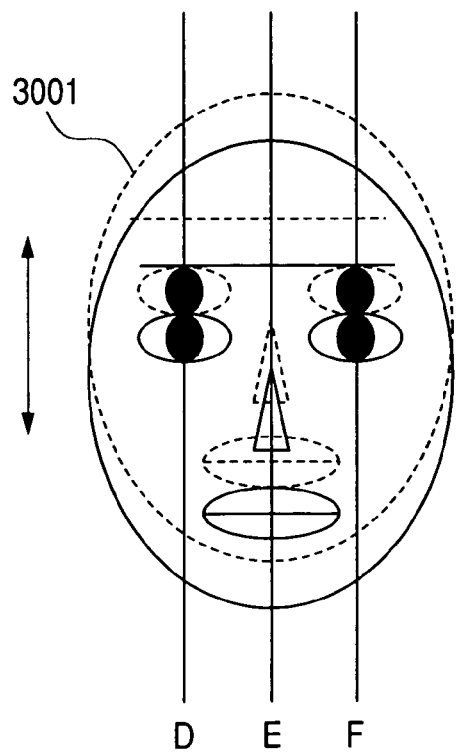
FIG. 13C is an explanatory drawing illustrating the motion of the operator's head according to an aspect of the present invention.

Referring now to FIGS. 13A, 13B and 13C which are explanatory drawings for explaining a motion of the neck of the operator 3001 according to an aspect of the present invention.

FIG. 13A shows the face of the operator 3001 at normal time. FIG. 13B shows the face of the operator 3001 who shakes his/her head. When the operator 3001 shakes his/her head, the face of the operator 3001 moves as shown by an arrow in FIG. 13B.

The measuring device using an image 3 extracts image data on horizontal lines A, B, C and calculates one-dimensional signal waveforms. Next, the measuring device using an image 3 applies Fourier transform to the calculated one-dimensional signal waveforms and acquires phase changes. The measuring device using an image 3 determines a shake of the head of the operator 3001 based upon the acquired phase change. When the operator 3001 shakes his/her head, phase changes on the horizontal lines A, B, C are the same. Therefore, the measuring device using an image 3 may also process only one of the horizontal lines A, B, C to reduce processing time.

The operator 3001 may choose an object of instruction depending upon a motion of the head. The measuring device using an image 3 can determine the motion by detecting a phase change of the face of the operator 3001. For example, a case in which the right side in FIG. 13B is set to a plus of a phase will be described below. When the measuring device using an image 3 detects that a phase of the face of the operator 3001 changes in a plus direction and next, changes in a minus direction, it determines that the operator 3001 chooses the left side. Similarly, when the measuring device using an image 3 detects that a phase of the face of the operator 3001 changes in a minus direction and next, changes in a plus direction, it determines that the operator 3001 chooses the right side.

FIG. 13C shows the face of the operator 3001 who nods. When the operator 3001 nods, the face of the operator 3001 moves as shown by an arrow in FIG. 13C.

The measuring device using an image 3 extracts image data on vertical lines D, E, F and creates one-dimensional signal waveforms. Next, the measuring device using an image 3 applies Fourier transform to the created one-dimensional signal waveforms and acquires phase changes. The measuring device using an image 3 determines a nod of the head of the operator 3001 based upon the acquired phase changes. Like the shake of the head, the measuring device using an image 3 may also process only one of the vertical lines D, E, F to reduce processing time.

As may be seen in FIG. 14 there is a flowchart showing the processing of the phase change detection program 135 executed in the measuring device using an image 3 according to an aspect of the present invention.

First, a position of the tracking object calculated by the position/distance calculation program 134 is obtained (10001). Next, image data on the horizontal lines and on the vertical lines are extracted with the obtained position in the center. Next, signal waveforms of the extracted image data are calculated and FFT operation is applied to the calculated signal waveforms (10002). In this case, the FFT operation is executed by Fourier transform shown in a mathematical expression 1.

$$F(s) = \frac{1}{\sqrt{n}} \sum_{r=0}^{n-1} u_r e^{2\pi i r s/n} \qquad \text{[Mathematical expression 1]}$$

"$u_r$" denotes a signal waveform of image data at time r and "n" denotes the number of data used when the signal waveform is calculated. Next, a phase $\theta_t$ of the signal waveform $u_r$ is calculated based upon the result of the FFT operation using a mathematical expression 2.

$$\theta_t = \tan^{-1}[Im\{F(s)\}/Re\{F(s)\}] \qquad \text{[Mathematical expression 2]}$$

Im(F) denotes an imaginary part of a function F, Re(F) denotes a real part of the function F, and $\theta_t$ denotes a phase of the signal waveform $u_r$ at time t. Next, a phase change $\theta$ is calculated based upon the phase $\theta_t$ using a mathematical expression 3.

$$\theta = \theta_t - \theta_{t-1} \qquad \text{[Mathematical expression 3]}$$

Thereby, a phase change $\theta^H$ in the image data on the horizontal line is computed (10003) and further, a phase change $\theta^V$ in the image data on the vertical line is computed (10004).

Next, it is determined whether the phase change $\theta^H$ on the horizontal line is larger than the phase change $\theta^V$ on the vertical line or not (10005).

When the phase change $\theta^H$ on the horizontal line is larger than the phase change $\theta^V$ on the vertical line, it is determined that the phase change on the horizontal line is notable (10006). For example, when the motion of the face of the operator 3001 shown in FIG. 13C is detected, it is determined that the operator 3001 nods.

In the meantime, when the phase change $\theta^H$ on the horizontal line is equal to or smaller than the phase change $\theta^V$ on the vertical line, it is determined that the phase change on the vertical line is notable (10007). For example, when the motion of the face of the operator 3001 shown in FIG. 13B is detected, it is determined that the operator 3001 negates.

In this configuration, the operator 3001 can input an operator command to the robot by moving his/her face and neck. Other electric appliance (for example, a television set) may be also considered as an object.

Heretofore, for a method of inputting an operator command, the input by pressing a button and the input by voice is known. However, the input of an operator command by voice has a problem that it takes more time than the input by pressing a button and further, many input errors occur. Therefore, the input of an operator command by voice is not realized except a driving course guidance system carried in a car realized for a special situation that a driver is required to constantly pay attention because the driver is driving. Then, according to the measuring device using an image 3 in this embodiment, an operator command input method that solves these problems can be provided.

Figure 15A:
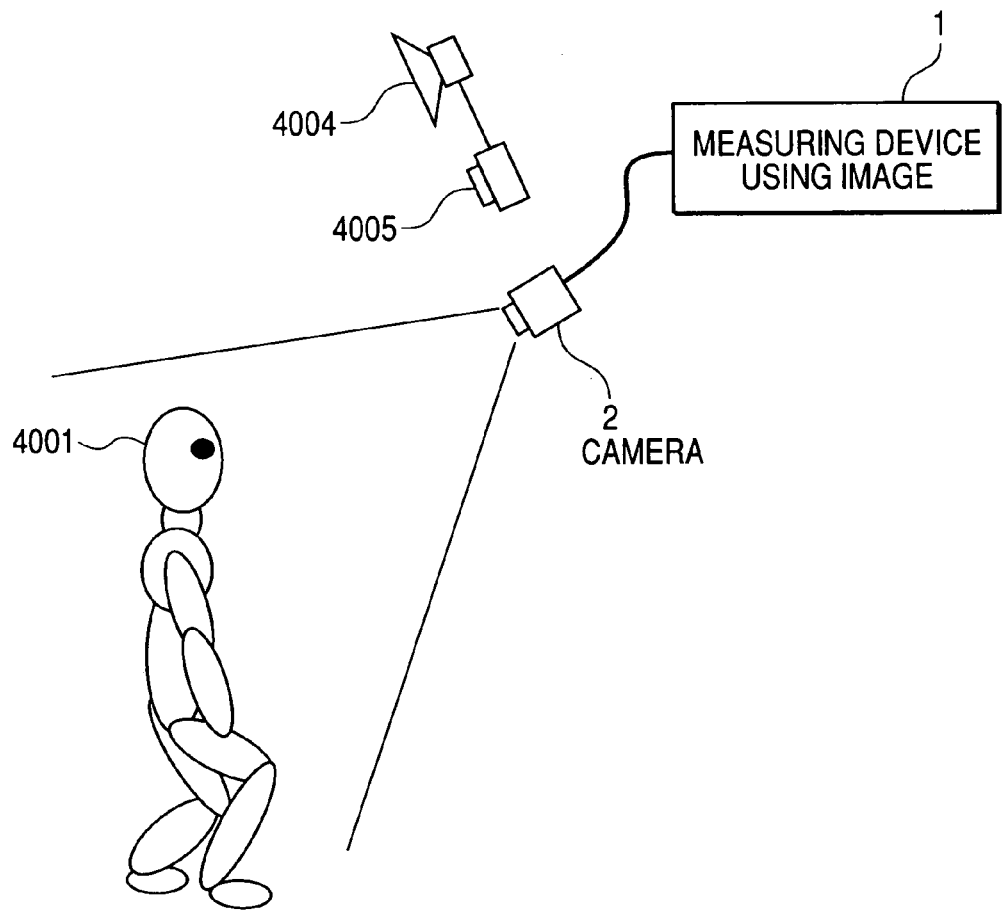
FIG. 15A is an explanatory drawing illustrating a suspicious person's surveillance/snap system to which a measuring device according to an aspect of the present invention.

According to an aspect of the present invention, and referring now to FIG. 15A in which there is shown an explanatory drawing for explaining suspicious person surveillance/snapping system to which a measuring device using an image 4 according to an aspect of the present invention is applied.

A suspicious person 4001 comes in a field of view of a camera 2 provided to a ceiling and others. The camera 2 snaps the suspicious person 4001 and sends the snapped image to the measuring device using an image 4.

The measuring device using an image 4 is provided with configuration described later in relation to FIG. 16 and is connected to the camera 2. The measuring device using an image 4 calculates a signal waveform on a predetermined line based upon the image snapped by the camera 2.

The measuring device using an image 4 determines whether the suspicious person 4001 exists in the field of view of the camera 2 or not based upon the calculated signal waveform. When the suspicious person 4001 exists in the field of view of the camera 2, the measuring device stores the image snapped by the camera 2. The image stored by the measuring device using an image 4 can be viewed later.

The suspicious person surveillance/snapping system in this embodiment may be also further provided with a night lighting system 4004 and an infrared ray sensor 4005. The infrared ray sensor 4005 lights the night lighting system 4004 when the infrared ray sensor 4005 senses human body temperature. When the night lighting system 4004 is lit, the brightness of an image snapped by the camera 2 rapidly changes. The measuring device using an image 4 stores the following images when it detects the change of the brightness of the image. The suspicious person surveillance/snapping system can also survey a suspicious person at night by being provided with the night lighting system 4004 and the infrared ray sensor 4005.

Figure 15B:
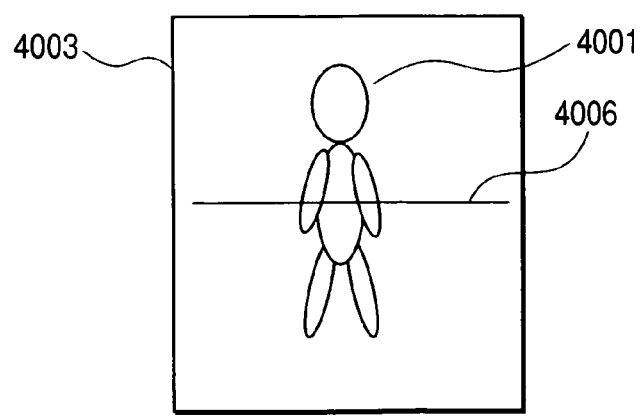
FIG. 15B is an explanatory drawing illustrating an image taken by a camera according to an aspect of the present invention.

As may be seen in FIG. 15B there is an explanatory drawing for explaining an image 4003 snapped by the camera 2 according to an aspect of the present invention.

The suspicious person 4001 is reflected in the image 4003 snapped by the camera 2.

The measuring device using an image 4 receives the image 4003 from the camera 2. Then, the measuring device using an image 4 calculates a signal waveform on the predetermined line 4006 based upon the image 4003. The measuring device using an image 4 determines whether the suspicious person 4001 exists in the field of view of the camera 2 or not based upon the calculated signal waveform. The predetermined line 4006 is effective when it is set to height at which only a person can be detected without detecting a dog and a cat.

Figure 16:
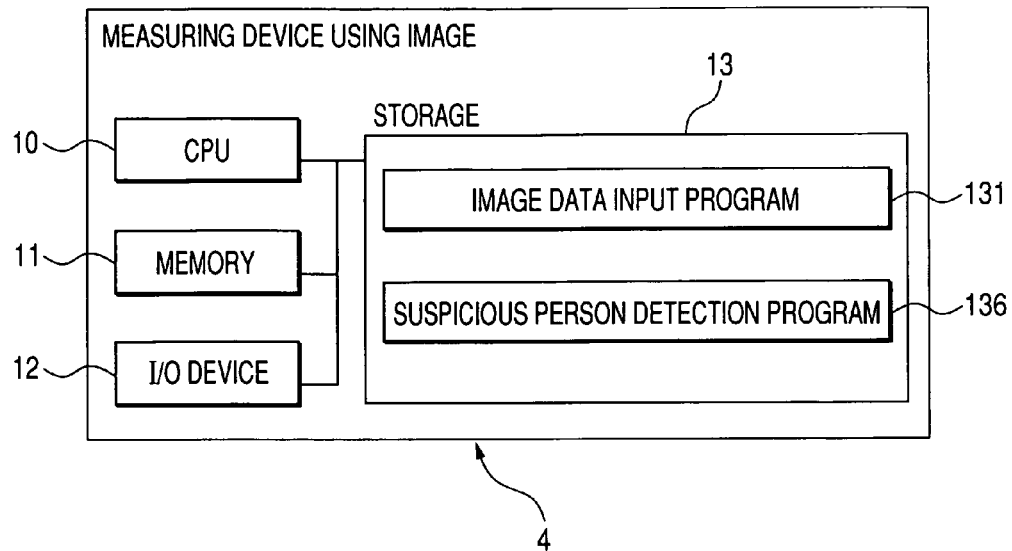
FIG. 16 is a block diagram showing the configuration of the measuring device according to an aspect of the present invention.

Turning to FIG. 16 there is shown a block diagram showing the configuration of the measuring device using an image 4 according to an aspect of the present invention.

The measuring device using an image 4 has the same configuration as that of the measuring device using an image 1 as was described hereinabove except that a suspicious person detection program 136 is stored in a storage 13 in place of the hue feature extraction program 132, the hue feature tracking program 133 and the position/distance calculation program 134. The same number is allocated to the same configuration and the description is omitted.

The suspicious person detection program 136 stores the following image when a change of the image input by an image data input program 131 is detected.

Figure 17:
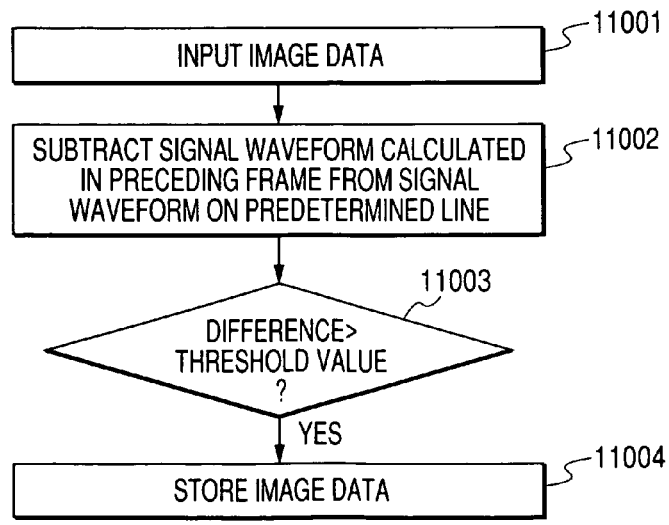
FIG. 17 is a flowchart showing the processing of a suspicious person detection program executed in the measuring device according to an aspect of the present invention.

Referring to FIG. 17 there is a flowchart showing the processing of the suspicious person detection program 136 executed in the measuring device using an image 4 according to an aspect of the present invention.

When the image data input program 131 inputs an image, a process is initiated (11001). Next, a signal waveform on the predetermined line is calculated based upon the input image. A signal waveform calculated in the preceding frame is subtracted from the calculated signal waveform (11002). Next, it is determined whether the acquired difference is larger than a threshold value or not (11003). The threshold value is preset to a value in which the suspicious person 4001 is detected and no dog and no cat are detected for example.

In case the difference is larger than the threshold value, the image input by the image data input program 131 is stored in a memory 11 (11004).

A conventional type suspicious person surveillance system turns on a lighting system when predetermined temperature is sensed by human body temperature sensor. However, the suspicious person surveillance system cannot acquire the information of a suspicious person sensed by the human body temperature sensor. The information of the suspicious person means the facial features and clothes of the suspicious person sensed by the sensor. Therefore, the conventional type suspicious person surveillance system has only extremely small deterrence effect upon a suspicious person. As a camera snapping function is added to the suspicious person surveillance/snapping system in this embodiment, a deterrent to a suspicious person can be enhanced and further, the information of the suspicious person can be stored.

The measuring device using an image according to the invention can acquire various information from a camera image. Therefore, the measuring device using an image according to the invention can be applied to fields utilizing information based upon an image snapped by the camera. For example, the measuring device using an image according to the invention can be applied to games virtually simulated in a computer, a suspicious person surveillance system, a person authentication system, and an equipment operation interface, reception service by a robot and service by a robot.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A measuring device for tracking an object, comprising:
   an image data input for inputting an image of the tracking object snapped by a camera;
   a tracker including a frame for extracting image data in a predetermined size from the image,
   wherein said frame is moved within the image and image data included within said frame is extracted from the image in each moved position and the number of pixels having a hue feature of the tracking object is counted based upon the extracted image data and a position of said frame in which said counted number of pixels is maximum is determined for every hue feature, and
   the position of the tracking object is calculated based upon the determined position of said frame; and
   a hue feature extractor extracting a hue feature of the tracking object by moving the frame to a position including at least a portion of the tracking object, extracting image data included in said frame, creating a hue histogram depending upon a hue value and the number of pixels having the hue value based from the extracted image data, choosing a conspicuous hue value based upon the created hue histogram and primarily storing the conspicuous hue value, moving the frame throughout the image excepting the position related to the primary storage, extracting image data included in the frame from the image at each position, counting the number of pixels having the primarily stored hue value, and setting the primarily stored hue value of the tracking object based upon a result of comparison of the counted number of pixels and a predetermined threshold value,
   wherein
   said hue feature extractor deletes the primarily stored hue value when the counted number of pixels is larger than the predetermined threshold value,
   said hue feature extractor secondarily stores the primarily stored hue value when the counted number of pixels is equal to or smaller than the predetermined threshold value, and
   said hue feature extractor sets the secondarily stored hue value as a feature of the hue of the tracking object.

* * * * *